United States Patent [19]

Nicholson

[11] 4,038,095

[45] July 26, 1977

[54] MIXTURE FOR PAVEMENT BASES AND THE LIKE

[75] Inventor: John Patrick Nicholson, Toledo, Ohio

[73] Assignee: Nicholson Realty Ltd., Sylvania, Ohio

[21] Appl. No.: 685,430

[22] Filed: May 11, 1976

[51] Int. Cl.² ............................................. C04B 1/00
[52] U.S. Cl. .................................... 106/118; 106/120; 106/DIG. 1
[58] Field of Search .................. 106/118, 120, DIG. 1

[56] References Cited

U.S. PATENT DOCUMENTS

| | | | |
|---|---|---|---|
| 2,942,993 | 6/1960 | Handy et al. | 106/118 |
| 3,076,717 | 2/1963 | Minnick | 106/118 |
| 3,852,084 | 12/1974 | Webster et al. | 106/118 |

Primary Examiner—J. Poer
Attorney, Agent, or Firm—Barnes, Kisselle, Raisch & Choate

[57] ABSTRACT

A mixture consisting essentially of fly ash, lime stack dust and aggregate which through pozzolanic reactions produces a hard, strong, durable mass capable of supporting surfacing.

8 Claims, 4 Drawing Figures

MIXTURE FOR PAVEMENT BASES AND THE LIKE

This invention relates to materials which are capable of supporting surfacing such as pavement bases.

BACKGROUND OF THE INVENTION

In road paving, at one time it was thought that the base for the surfacing material should comprise a granular or gravel base. However, more recently, it has been concluded that there was a considerable difference in the performance between such bases and cement-aggregate or bituminous (asphalt)-aggregate bases. As reported in the Highway Research Board Special Report 61E, titled The AASHO Road Test, Report 5, Pavement Research, publication 954 of National Academy of Sciences — National Research Council, there is a clear superiority of such treated bases over untreated bases. In recent years, treated bases have become commonly known as stabilized bases.

In subsequent work, for example, use of asphalt mixtures in all courses of pavement above the subgrade has been proposed, The Asphalt Institute, Information Series No. 146, June 1968. Asphalt stabilized bases have become the most dominant stabilized base utilized to support a flexible surfacing such as asphalt concrete. In addition, asphalt concrete has found extensive use as a resurfacing material for concrete pavement.

It has also been proposed that a lime-fly ash-aggregate stabilized base be used in road paving. Such a base consists of a mixture of proper quantities of lime, fly ash, and graded aggregate at optimum moisture content, in which the stability is greatly enhanced by the cementing action which results from complex chemical reactions between the lime and the fly ash in the presence of water.

Stabilized bases are usually employed as base courses under wearing surfaces such as hot mixed, hot laid asphaltic concrete. A wearing surface is necessary to resist the high shearing stresses which are caused by traction, but the stabilized base provides the required stability to support wheel loads.

A serious obstacle to the expanded use of stabilized bases is the high energy costs for making the materials.

For example, it is well known that the production of portland cement which is used in stabilizing bases requires substantial quantitites of coal in manufacture. In fact, the United States Department of Transportation has suggested that fly ash be substituted for a portion of the portland cement utilized in concrete or cement-aggregate bases, Federal Highway Administration Notice N5080.4, Jan. 17, 1974.

The use of asphalt in asphalt-aggregate bases which is derived from petroleum processing not only utilizes petroleum which is in short supply but also requires high energy to produce them.

Similarly, the lime, fly ash and graded aggregate stabilized bases utilize lime which requires coal in production. Such bases have been used in limited geographical areas of the United States where they can compete economically because of availability of lime and fly ash.

Thus, the predominantly used stabilized bases utilize materials that are in short supply and require substantial quantities of energy to produce them. The materials may be termed energy intensive. There is a need to avoid or minimize the use of such energy intensive materials in road paving.

Accordingly, among the objects of the invention are to provide a mixture of materials for producing a stabilized base comprising a hard, strong, durable mass capable of supporting surfacing which avoids or minimizes the use of materials which are energy intensive and, moreover, utilizes materials that normally are waste materials that are readily available.

SUMMARY OF THE INVENTION

Basically, the invention comprises a mixture consisting essentially of fly ash, lime stack dust and aggregate which through pozzolanic reactions produces a hard, strong, durable mass capable of supporting surfacing.

DESCRIPTION

Figures 1, 2:
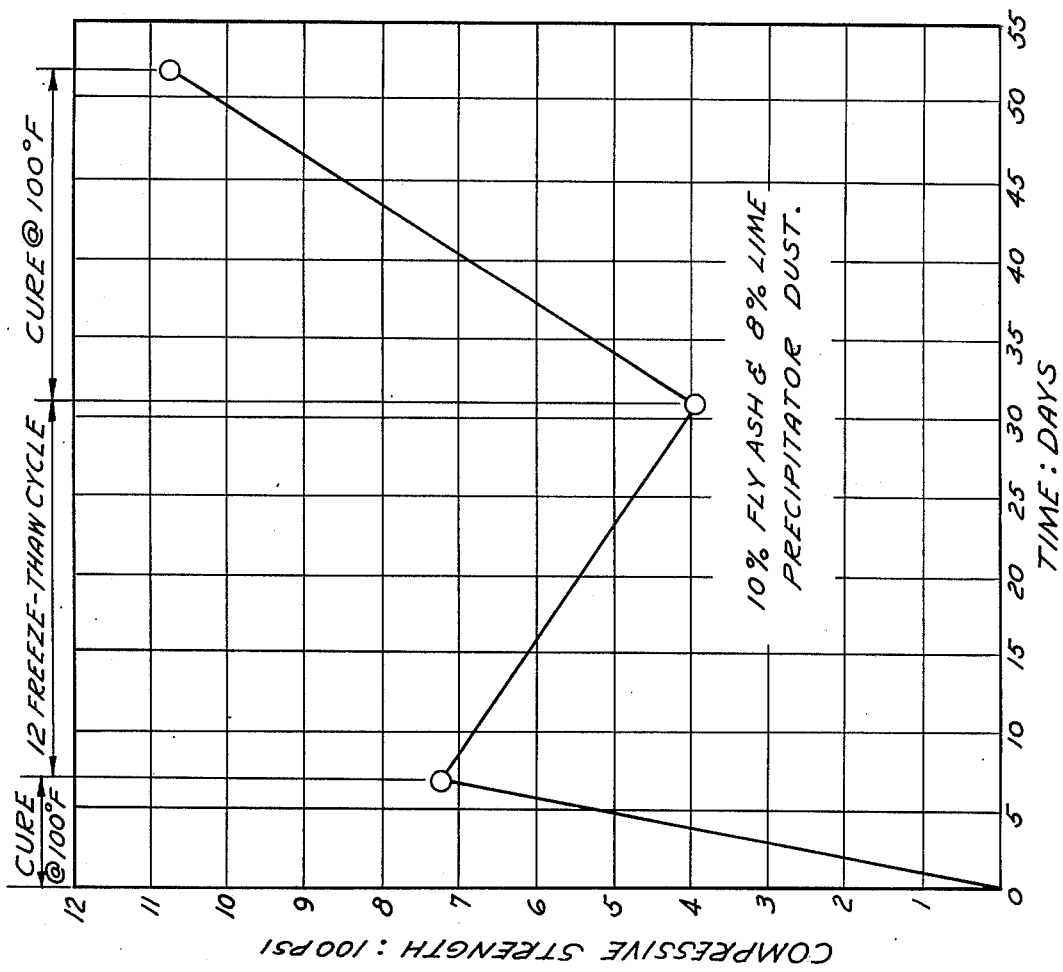
FIG. 1 is a curve of compressive strength versus age at test for various compositions.
FIG. 2 is a curve of compressive strength versus age in a freeze-thaw test.

In accordance with the invention, the pozzalanic load supporting composition utilizes lime stack dust.

The solid waste generated by lime manufacture is primarily lime stack dust. This dust contains a mixture of raw kiln feed, partly calcined material, and finely divided material. There is no value in returning the dust to the kiln, as it is too fine and passes directly through to the precipitator again. Up to about 15% of the raw materials processed may be collected as dust. It is usually stock-piled as a waste material which must be disposed and may be a nuisance and possibly a hazard.

Although the chemical reactions occurring in the resultant lime stack dust are not well known, typical lime stack dust has a chemical composition as follows:

CaO
MgO
S
$CO_2$
Loss on Ignition
Available Lime

More specifically, typical lime stack dust may have the following analyses:

| Sample No. | CaO | MgO | S | $CO_2$ | Loss on Ignition | Available Lime | $SO_3$ |
|---|---|---|---|---|---|---|---|
| 1 | 43.39 | 29.82 | 0.80 | 22.30 | 24.60 | 17.58 | — |
| 2 | 37.54 | 27.10 | — | 17.72 | 26.99 | 10.98 | 3.43 |
| 3 | 35.86 | 26.20 | — | 12.84 | 30.15 | 8.29 | 4.99 |
| 4 | 35.85 | 32.03 | 0.77 | 21.5 | 34.66 | 8.63 | — |
| 5 | 43.42 | 32.24 | 0.82 | 13.0 | 22.92 | 20.17 | — |
| 6 | 35.86 | 25.99 | 0.41 | 21.8 | 36.38 | 7.96 | — |
| 7 | 39.50 | 30.02 | 0.74 | 17.58 | 26.78 | 15.58 | — |
| 8 | 35.58 | 25.39 | 0.23 | 18.96 | 35.78 | 8.68 | — |
| 9 | 40.90 | 30.02 | 0.78 | 11.02 | 24.46 | 15.54 | — |
| 10 | 39.22 | 25.99 | 0.95 | 22.2 | — | 11.43 | — |
| 11 | 37.54 | 28.00 | 0.60 | 19.00 | — | 13.22 | — |
| 12 | 35.99 | 27.80 | 1.20 | — | 31.86 | 9.75 | — |
| 13 | 40.62 | 30.72 | 0.62 | — | 25.53 | 16.58 | — |
| Mean | 38.55 | 28.56 | 0.70 | 17.99 | 29.10 | 12.64 | — |
| Max | 43.42 | 32.24 | 1.02 | 22.30 | 36.38 | 20.17 | — |
| Min | 35.58 | 25.39 | 0.23 | 11.02 | 22.92 | 8.29 | — |
| Range | 7.84 | 6.85 | 0.79 | 11.28 | 13.46 | 11.88 | — |
| Mid-Range | 39.50 | 28.81 | 0.62 | 16.66 | 29.65 | 14.23 | — |

When mixtures made in accordance with the invention and mixed with water to produce a pozzolanic reaction have been tested in accordance with the specifications given in ASTM C-593 for fly ash and other pozzolans for use with lime, it has been found that the compositions meet or exceed the specifications.

The term "fly ash" as used in connection with stabilized bases is well known and as used herein is intended to indicate the finely divided ash residue produced by the combustion of pulverized coal or lignite, which ash is carried off with the gases exhausted from the furnace in which the coal is burned and which is collected from these gases usually by means of suitable precipitation apparatus such as electrical precipitators. Those finely pulverized ashes resulting from combustion of oil and from combustion of waste materials in a large incinerator or natural pozzolans can also be utilized in the methods described herein providing their chemical compositions are reasonably similar to pulverized coal fly ashes. The fly ash so obtained is in a finely divided state such that usually at least 70% by weight passes through a 200-mesh sieve, although incinerator ashes may be considerably coarser. Fly ash may be considered an "artificial pozzolan", as distinguished from a "natural pozzolan".

The term "aggregate" as used in connection with load supporting compositions is also well known and refers to natural or artificial inorganic materials most of which are substantially chemically inert with respect to fly ash and lime, and substantially insoluble in water. Typically, aggregate may comprise limestone, sand, blast furnace slag, gravel, synthetic aggregate and other similar material.

Aggregates can comprise a wide range of types and gradations, including sands, gravels, crushed stones, and several types of slag. Aggregates should be of such gradation that, when mixed with lime stack dust, fly ash and water, the resulting mixture is mechanically stable under compaction equipment and capable of being compacted in the field to high density. The aggregate should be free from deleterious organic or chemical substances which may interfere with the desired chemical reaction between the lime stack dust, fly ash and water. Further, the aggregate should preferably consist of hard, durable particles, free from soft or distintegrated pieces.

It has been found that a preferable mixture comprises:

|  | Per Cent by Dry Weight |
|---|---|
| Lime Stack Dust | 8% |
| Fly Ash | 12% |
| Aggregate | 80% |
| Total | 100% |

However, the mixture for use in road stabilizer bases may preferably vary as follows:

|  | Per Cent by Dry Weight |
|---|---|
| Lime Stack Dust | 5 to 15% |
| Fly Ash | 10 to 14% |
| Aggregate | 71 to 85% |

As indicated above, tests were conducted in accordance with ASTM C-593. More specifically, the test specimens were molded using a mechanical compactor, having a 10 pound hammer with an 18 inch drop. The material was placed in the molds in three equal layers, and compacted by 25 blows per layer. The machine has a revolving turntable to evenly distribute the blows over the surface of the layer being compacted.

After molding, the samples were carefully removed from the molds, weighed, and sealed in plastic bag, labeled for identification, and placed in a constant temperature oven at 100° F to cure until tested. Two cylinders of each mix were marked for testing at 7, 14 and 28 days of curing. After removal from the oven, the samples are submerged in water for four hours, removed, and allowed to drain on a non-absorbant surface, capped, and tested within one hour after removal from the water. The capping compound used in "Hydro-Stone" a lime based, quick-hardening compound. Plate glass was used to obtain even, parallel caps on the test specimens.

Examples of various tests and compositions are as follows:

EXAMPLE I

| Lime precipitator dust | 5% |
|---|---|
| Fly ash | 18% |
| Graded aggregate (¾" maximum size) | 77% |
|  | 100% |

This group of cylinders was designated Batch 1.

| Batch No. | Cylinder No. | Moisture (%) | Dry Weight (pcf) | % Max. Dry Weight | Failure Load (lbs) | Compressive Strength (psi) |
|---|---|---|---|---|---|---|
| 1 | 11 | 7.6 | 128.8 | 99.5 | 4375 | 350 |
|  | 12 | 7.6 | 129.0 | 99.7 | 7450 | 595 |
|  | 13 | 7.6 | 128.5 | 99.3 | 7050 | 560 |
|  | 14 | 7.8 | 128.6 | 99.4 | * |  |
|  | 15 | 7.8 | 129.4 | 100.0 | 7800 | 620 |
|  | 16 | 7.8 | 127.2 | 98.3 | 7875 | 625 |

*Specimen No. 4 destroyed prior to load reading

EXAMPLE II

|  | Batch No. 2 | Batch No. 3 |
|---|---|---|
| Lime precipitator dust | 6% | 5% |
| Fly ash | 18% | 12% |
| Graded aggregate (¾" maximum size) | 76% | 83% |
|  | 100% | 100% |

This group of cylinders was designated as Batches 2 and 3.

| Batch No. | Cylinder No. | Moisture (%) | Dry Weight (pcf) | % Max. Dry Weight | Failure Load (lbs) | Compressive Strength (psi) |
|---|---|---|---|---|---|---|
| 2 | 21 | 7.5 | 127.3 | 99.7 | 3625 | 290 |
|  | 22 | 7.5 | 127.8 | 100 | 8510 | 680 |
|  | 23 | 7.5 | 126.4 | 98.9 | 12575 | 1000 |
| 3 | 31 | 9.5 | 133.2 | 99.9 | 2825 | 225 |
|  | 32 | 9.5 | 132.1 | 99.1 | 3600 | 285 |
|  | 33 | 9.5 | 132.4 | 99.3 | 3250 | 260 |

EXAMPLE III

| Lime precipitator dust | 6% by weight |
|---|---|
| Fly ash | 6% |
| Graded aggregate (¾" maximum size) | 88% |
|  | 100% |

This group of cylinders was designated as Batches 4 and 5.

| Batch No. | Cylinder No. | Moisture (%) | Dry Weight (pcf) | % Max. Dry Weight | Failure Load (lbs) | Compressive Strength (psi) |
|---|---|---|---|---|---|---|
| 4 | 41 | 8.8 | 135.9 | 99.9 | 4900 | 390 |
|  | 42 | 8.8 | 135.1 | 99.3 | 5200 | 415 |
|  | 43 | 8.8 | 135.4 | 99.6 | 4250 | 340 |
| 5 | 51 | 8.5 | 135.5 | 99.6 | 4800 | 380 |
|  | 52 | 8.5 | 136.0 | 100 | 4675 | 370 |
|  | 53 | 8.5 | 135.7 | 99.8 | 3775 | 300 |
| Average |  |  |  |  |  | 365 |

EXAMPLE IV

| Lime precipitator dust | 8% by weight |
|---|---|
| Fly ash | 12% |
| Graded aggregate (¾" maximum size) | 80% |

FREEZE-THAW TEST DATA

| Cylinder No. | Aggregate No. | % Moisture | % "Lime" | % Flyash | Dry Density (pcf) | Compressive[1] Strength (psi) | Original Dry Weight (lbs) | Weight Loss after 12 F-T Cycles (lbs) | % Weight Loss after 12 F-T Cycles | Compressive Strength after 12 F-T cycles (psi) | Compressive Strength[2] after Re-curing (psi) |
|---|---|---|---|---|---|---|---|---|---|---|---|
| 81 | 1 | 8.7 | 8 | 10 | 132.7 | 688 | | | | | |
| 82 | 1 | 8.7 | 8 | 10 | 133.6 | 745 | | | | | |
| 83 | 1 | 8.7 | 8 | 10 | 133.3 | 760 | | | | | |
| 84 | 1 | 8.7 | 8 | 10 | 133.4 | | 4.55 | 0.23 | 5 | | |
| 85 | 1 | 8.7 | 8 | 10 | 133.1 | | 4.53 | 0.19 | 4 | 806 | |
| 86 | 1 | 8.7 | 8 | 10 | 133.7 | | 4.59 | 0.16 | 3 | (3) | 1180 |
| 91 | 2 | 9.2 | 8 | 10 | 129.6 | 653 | | | | | |
| 92 | 2 | 9.2 | 8 | 10 | 129.9 | 818 | | | | | |
| 93 | 2 | 9.2 | 8 | 10 | 129.6 | 703 | | | | | |
| 94 | 2 | 9.1 | 8 | 10 | 130.3 | | 4.67 | 0.15 | 3 | | 1075 |
| 95 | 2 | 9.1 | 8 | 10 | 130.6 | | 4.69 | 0.15 | 3 | 396 | |
| 96 | 2 | 9.1 | 8 | 10 | 130.3 | | 4.66 | 0.24 | 5 | | |
| 101 | 1 | 8.9 | 8 | 12 | 129.2 | 768 | | | | | |
| 102 | 1 | 8.9 | 8 | 12 | 129.5 | 798 | | | | | |
| 103 | 1 | 8.9 | 8 | 12 | 128.9 | 621 | | | | | |
| 104 | 1 | 8.7 | 8 | 12 | 130.0 | | 4.47 | 0.81 | 18 | | |
| 105 | 1 | 8.7 | 8 | 12 | 129.2 | | 4.41 | 0.76 | 17 | | |
| 106 | 1 | 8.7 | 8 | 12 | 129.4 | | 4.38 | 0.93 | 21 | | |
| 111 | 2 | 8.7 | 8 | 12 | 130.0 | 860 | | | | | |
| 112 | 2 | 8.7 | 8 | 12 | 129.7 | 826 | | | | | |
| 113 | 2 | 8.7 | 8 | 12 | 129.7 | 999 | | | | | |
| 114 | 2 | 8.6 | 8 | 12 | 130.1 | | 4.49 | 0.47 | 10 | | |
| 115 | 2 | 8.6 | 8 | 12 | 129.8 | | 4.58 | 1.36 | 30 | | |
| 116 | 2 | 8.6 | 8 | 12 | 130.7 | | 4.52 | 0.34 | 8 | | |

[1]Compressive strength after 7 days cure at 100° F per C593
[2]Cured 21 days at 100° F per C593, after undergoing 12 freeze-thaw cycles.
[3]Specimens 85 and 86 air cured 5 days after completion of 12 freeze thaw cycles and before further testing.

This group of cylinders is designated Batch No. 6.

| Batch No. | Cylinder No. | Moisture (%) | Dry Weight (pcf) | % Max. Dry Weight | Failure Load (lbs) | Compressive Strength (psi) |
|---|---|---|---|---|---|---|
| 6 | 61 | 8.4 | 130.6 | 99.5 | 11,700 | 930 |
| | 62 | 8.4 | 130.0 | 99.1 | 11,925 | 950 |
| | 63 | 8.4 | 129.5 | 98.7 | 13,200 | 1050 |
| | 64 | 8.6 | 130.4 | 99.4 | 11,450 | 910 |
| | 65 | 8.6 | 129.8 | 98.9 | 10,800 | 860 |
| | 66 | 8.6 | 129.6 | 98.8 | 11,700 | 930 |
| Average | | | 129.98 | | | 940 |

EXAMPLE V

| Lime precipitator dust | 8% by weight |
|---|---|
| Fly ash | 10% |
| Graded aggregate (¾" maximum size) | 82% |
| | 100% |

This group of cylinders is designated Batch No. 7.

| Batch No. | Cylinder No. | Moisture (%) | Dry Weight (pcf) | % Max. Dry Weight | Failure Load (lbs) | Compressive Strength (psi) |
|---|---|---|---|---|---|---|
| 7 | 71 | 8.7 | 129.9 | 99.7 | 7900 | 630 |
| | 72 | 8.7 | 129.7 | 99.5 | 9150 | 730 |
| | 73 | 8.7 | 128.9 | 98.9 | 9500 | 755 |
| | 74 | 8.5 | 130.2 | 99.9 | 7200 | 575 |
| | 75 | 8.5 | 129.1 | 99.1 | 8750 | 700 |
| | 76 | 8.5 | 129.7 | 99.5 | 8000 | 640 |
| Average | | | 129.6 | | | 670 |

The results of the tests are summarized in FIG. 1 and the following table:

TABLE OF INGREDIENTS

| Ingredient | % By Weight | | | | | | | |
|---|---|---|---|---|---|---|---|---|
| | 1 | 2 | 3 | 4 | 5 | 6 | 7 | 8 |
| Aggregate | 86 | 86 | 86 | 86 | 81 | 80 | 79 | 69 |
| Fly Ash | 7.6 | 6.0 | 11.0 | 11.0 | 11.0 | 11.0 | 11.0 | 11.0 |
| Precipitator Dust | 6.4 | 8.0 | — | — | 8.0 | 9.0 | 10.0 | 20.0 |
| Hydrated Lime | — | — | 3.0 | 3.0 | — | — | — | — |

In addition, freeze-thaw tests were conducted in accordance with ASTM Specifications C-593. A total of four batches were tested for twelve freeze-thaw cylces each. The data is set forth in the following table:

The following table summarizes the results of the test:

Summary of Freeze-Thaw Test Results

| Aggregate No. | % Flyash | Dry Density (pcf) | | Mean % Weight loss After 12 Cycles | Mean Compressive Strength (psi) |
|---|---|---|---|---|---|
| | | Mean | Std. Dev. | | |
| 1 | 10 | 133.3 | 0.36 | 4.0 | 698 |
| 2 | 10 | 130.1 | 0.42 | 3.7 | 725 |
| 1 | 12 | 129.4 | 0.37 | 18.7 | 729 |
| 2 | 12 | 130.0 | 0.38 | 16.0 | 895 |

In addition, certain cylinders in Batch No. 6 containing 8% lime precipitator dust, 12% fly ash and 80% aggregate were tested for autogenous healing. Cylinder No. 66 was too badly damaged from the original compression test to be "healed", but the remaining five were utilized.

We are not aware of a standard test for autogenous healing. The five cylinders in question were soaked in water for 8 days and then over cured in closed cans for 7 days at 100° F. After completion of over curing, the five cylinders were inadvertently allowed to remain in air at room temperature for 4 more days before the compression tests were run.

All the cylinders were, of course, cracked from the original compression test and slightly deformed. But nothing was done to the cylinders other than the operations described in the previous paragraph. The original caps were left in place and re-used.

Results were as follows:

| Cylinder No. | Failure Load (lbs) | | Compressive Strength (psi) | | Rank | | "Healed" Original |
|---|---|---|---|---|---|---|---|
| | Original | "Healed" | Original | "Healed" | Original | "Healed" | |
| 61 | 11,700 | 12,800 | 930 | 1015 | 3 | 4 | 1.09 |
| 62 | 11,925 | 13,850 | 950 | 1100 | 2 | 2 | 1.16 |
| 63 | 13,200 | 15,300 | 1050 | 1210 | 1 | 1 | 1.15 |

-continued

| Cylinder No. | Failure Load (lbs) Original | Failure Load (lbs) "Healed" | Compressive Strength (psi) Original | Compressive Strength (psi) "Healed" | Rank Original | Rank "Healed" | "Healed" Original |
|---|---|---|---|---|---|---|---|
| 64 | 11,450 | 13,250 | 910 | 1050 | 4 | 3 | 1.15 |
| 65 | 10,800 | 11,125 | 860 | 885 | 5 | 5 | 1.03 |
| Average | | | 940 | 1050 | | | 1.12 |

Figure 3:
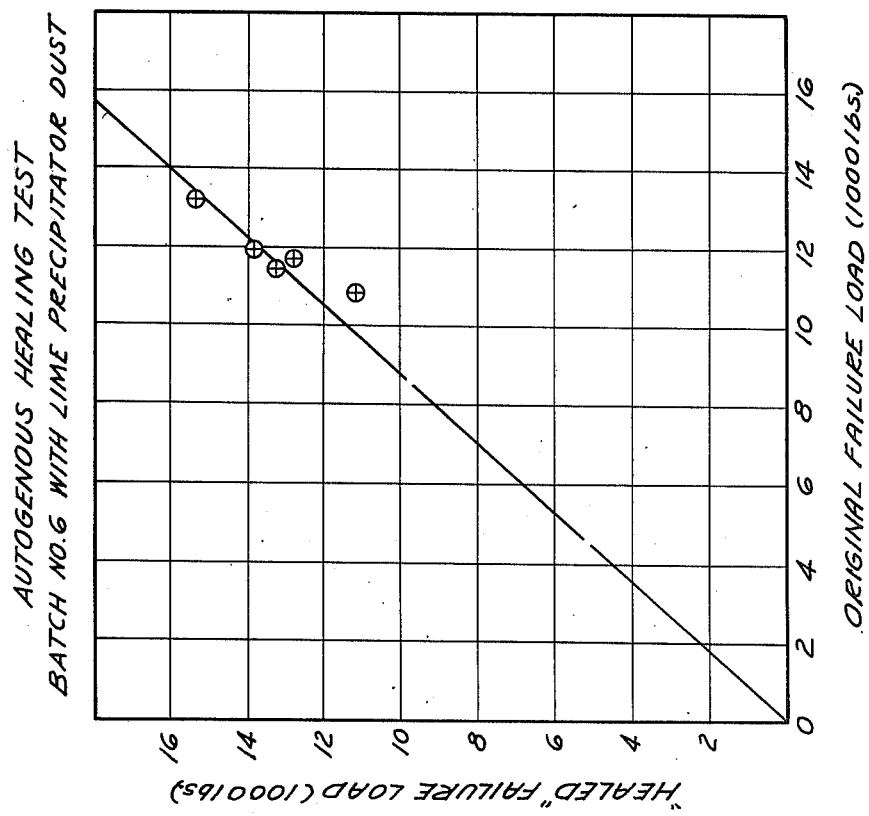
FIG. 3 is a curve of healed failure load versus original failure load in an autogenous healing test.

The results of these tests are set forth in FIG. 3.

Thus, the mixtures of the present invention result in a stabilized base that is comparable in strength and required performance characteristics to cement-aggregate or lime-fly ash-aggregate stabilized based and yet are not energy intensive. The mixtures of the present invention cost less than the predominantly used asphalt-aggregate bases. Also, the use of mixtures of the invention releases asphalt for use in resurfacing or as a heavy industrial fuel.

Figure 4:
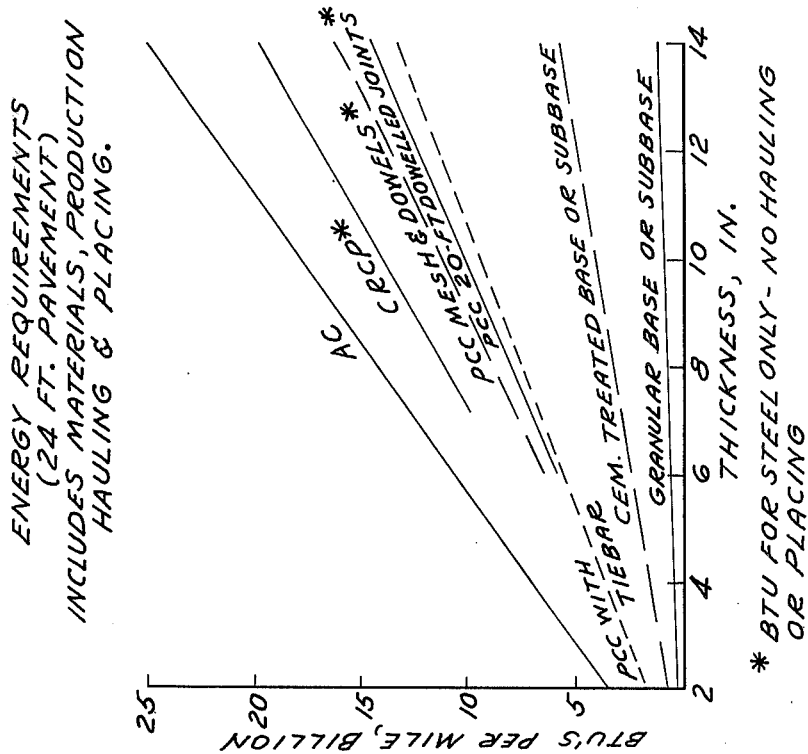
FIG. 4 is a curve of energy requirements for various pavement materials.

FIG. 4 is a curve showing the BTU's per mile versus thickness for various road paving materials taken from Highway Research Circular titled "Fuel Usage Factors for Highway Construction", Number 158, July, 1974. It can be seen that asphalt concrete and cement type mixtures require substantial energy and only granular base or sub-base of aggregate has minimal energy requirements in hauling, spreading, compacting and finishing. Since the mixture of the present invention utilize waste materials, namely, lime stack dust and fly ash, the energy requirements for making a stabilized base are only in hauling, spreading, compacting and finishing. As a result, the mixtures of the present invention have minimal energy requirements and thereby obviate the energy intensive materials of prior stabilized bases.

I claim:

1. A mixture consisting essentially of fly ash, lime stack dust and aggregate which through pozzolanic reactions produces hard, strong, durable mass capable of supporting surfacing.

2. The mixture set forth in claim 1 wherein the aggregate comprises the major constituent.

3. The mixture set forth in claim 1 wherein said fly ash is in an amount between about 10% and 14% by dry weight, said lime stack dust is in an amount between about 5% and 15% by dry weight, and said aggregate is in an amount between about 71% and 85% by dry weight.

4. The mixture set forth in claim 1 wherein said fly ash comprises 12% by dry weight, said lime stack dust comprises 8% by dry weight, and said aggregate comprises 80% by dry weight.

5. The mixture set forth in claim 1 including a small amount of calcium chloride.

6. The method of making a stabilized load bearing material which comprises mixing lime stack dust, fly ash, aggregate and water, compacting the mixture, and permitting the mixture to react to ambient temperatures to produce a hard, strong, durable mass.

7. A mixture consisting essentially of pozzolan, lime stack dust and aggregate which through pozzolanic reactions produces a hard, strong, durable mass capable of supporting surfacing.

8. The method of making a stabilized load bearing material which comprises mixing lime stack dust, fly ash, aggregate and water, said fly ash being in an amount between about 10% and 14% by dry weight, said lime stack dust being in an amount between about 5% and 15% by dry weight, compacting the mixture, and permitting the mixture to react to ambient temperatures to produce a hard, strong, durable mass.

* * * * *